United States Patent [19]
Ameye et al.

[11] Patent Number: 6,042,868
[45] Date of Patent: Mar. 28, 2000

[54] PROCESS FOR THE PREPARATION OF SOFTENED SEEDS

[75] Inventors: Serge Hector Ameye, Lennik; Pierre Patrick Aldo Tossut, Fleron, both of Belgium; Hans-Christian Janke, Lennestadt, Germany

[73] Assignee: Puratos Naamloze Vennootschap, Belgium

[21] Appl. No.: 08/905,485

[22] Filed: Aug. 4, 1997

[30] Foreign Application Priority Data

Aug. 2, 1996 [EP] European Pat. Off. ............ 968701003

[51] Int. Cl.⁷ ....................................... A23B 9/02
[52] U.S. Cl. ........................ 426/629; 426/653; 426/507; 426/508
[58] Field of Search ................... 426/8, 44, 46, 426/106, 113, 629, 634, 653, 407, 442, 507–508

[56] References Cited

U.S. PATENT DOCUMENTS 5,026,570  6/1991  Shibata .................................. 426/626

FOREIGN PATENT DOCUMENTS

0191573 A2  8/1986  European Pat. Off. .
0415787 A1  3/1991  European Pat. Off. .
807 984  1/1959  United Kingdom .

OTHER PUBLICATIONS

Patent Abstracts of Japan, vol. 017, No. 589 (C–1124), Oct. 27, 1993, JP5176693 (SB SHOKUHIN KK).

Database WPI, Section Ch, Week 9503, Derwent Publication Ltd., London, GB; Class D13, AN 95–018216, XP002023037 & JP–A–06 303 909 (Kameda Seika CO LTD), Nov. 01, 1994.

*Primary Examiner*—Milton Cano
*Attorney, Agent, or Firm*—Knobbe, Martens, Olson & Bear, LLP

[57] ABSTRACT

The present invention relates to a process for the preparation and for the precooking of whole or crushed softened seeds which are used as an ingredient in food compositions, in particular in bakery products. The process involves mixing the seeds to be steeped with water; acidifying the mixture of seeds and of water to a pH of less than about 4.5; cooking the thus acidified mixture of seeds and of water; and packaging the moist product. The present invention also relates to the packaging, preferably vacuum packaging, containing the products thus treated.

16 Claims, No Drawings

PROCESS FOR THE PREPARATION OF SOFTENED SEEDS

BACKGROUND OF THE INVENTION

1. Field of the Invention

The present invention relates to a process for the preparation and for the precooking of whole or crushed seeds in order, on the one hand, to make it possible to stabilize the preparation and, on the other hand, to be able to use them without prior steeping treatment operations in food uses, in particular in bakery applications. The present invention also relates to a packaging, preferably vacuum packaging, of such seeds which makes possible prolonged preservation at room temperature and to the immediate use without requiring prior steeping.

2. Technological Background

In many countries, and in particular in Germany, softened cereal, fabaceae, cucurbitaceae or oleaginous seeds are used in various types of bread (wholemeal bread or white bread, rye bread, sunflower bread, linseed bread, and the like). The seeds can be used whole or crushed.

The softening of the seeds is obtained by steeping the seeds in water or by heat treatment (injection of steam, cooking).

In general, the baker uses the process of steeping in water. Depending on the temperature of the water, two types of steeping are distinguished:

Brühstück: the seeds are steeped in hot water (70–100° C.). The container containing the water and the seeds is stored either for 6 hours at 20° C. or for 4 hours at 40° C.

Quellstück: the seeds are steeped in cold water (10–30° C.). The mixture of seeds and water is stored either for 12 hours at 20° C. or for 8 hours at 40° C.

The proportion of water and seeds is generally 1 to 1. After steeping, all the water is absorbed by the seeds.

However, during steeping, undesirable fermentations can take place due to microbial contaminations. These fermentations have a harmful effect on the taste and are unacceptable for public health reasons. These contaminations, in particular the growth of *Bacillus mesentericus* (an agent which causes dough to become ropy) the spores of which are resistant to cooking in an oven, should be avoided.

Steeping thus constitutes a critical stage with respect to the microbiological quality of the obtained product. Hygiene precautions must consequently be taken by the user.

The conventional Brühstück and Quellstück preparation in any case requires a lengthy operating time, in particular for the presteeping.

Various publications describe products, in particular cereal products, which have been treated by acidification and by cooking in order to be used as it is in food applications.

The document EP-A-0415787 describes rice which is stable on storage and which is pasteurized in acidic medium. The targeted aim is to obtain a product described as a convenience food which can be rapidly reheated by the user and which retains its organoleptic features. It is proposed to use polymeric acids, such as alginic acid.

In column 6, lines 39 et seq., it is indicated that it is desirable to obtain rice which is firm without being hard, rubbery or soft and that it must moreover be non-sticky. The rice can be precooked or partially cooked.

It is indicated that this rice, advantageously in the absence of free water, can be packaged in a container which is impermeable to microorganisms, so as to ensure its stability during storage. Packaging is preferably carried out under vacuum (column 9, lines 13–50).

It thus does not in any way relate to softened seeds constituting an ingredient with other constituents in a food composition.

The document EP-A-0191573 describes a process for the treatment of foodstuffs, such as vegetables and cereal seeds, by treatment in the presence of a mixture of an acid and lactones, in particular the aldonic acid and the corresponding lactones, for the purpose of sterilizing them at lower temperatures and/or for shorter times while retaining the intrinsic properties of the foodstuff.

It again relates to obtaining a product which can be described as a convenience food which is used as it is. The product can be packaged hermetically and then heat treated.

On page 44, lines 4–21, reference is made to a series of products which can be treated in this way, among which appear unleavened doughs which are not intended for bakery applications.

A series of other documents, such as the document GB-A-807084 (Example V), the document U.S. Pat. No. 5,026,570 (see the examples) and the document Patent Abstracts of Japan, vol. 17, No. 589 (C-1124), which makes reference to the document JP-A-05176693, relate to cereal foodstuffs, essentially rice and groats, which are heat and acid treated and which undergo a final drying.

SUMMARY OF THE INVENTION

The process of the present invention is targeted at overcoming the abovementioned disadvantages by making available to the professional user softened ready-for-use seeds, of guaranteed microbiological quality, in the form of a packaging which ensures their preservation. Thus, the present invention relates to convenience food which is used "as is" by the user. The present invention is targeted at obtaining a precooked product derived from whole and crushed seeds which have been softened and which is used as an ingredient in food compositions.

DETAILED DESCRIPTION OF THE PREFERRED EMBODIMENT

The process of the present invention comprises the following stages:

mixing the seeds to be steeped with water, preferably in the proportion of one volume of seeds per volume of water;

acidifying the mixture of seeds and water to a pH of less than 4.5 and preferably of less than 4.2; and cooking the obtained acidified mixture of seeds and water and possibly packaging the moist product.

Salt (NaCl) is preferably added to the mixture of seeds and of water, in the preferred proportion of approximately 2% calculated with respect to the weight of the seeds.

The acidification can be carried out by addition either of lactic acid or of acetic acid or of citric acid or of other acids, whether organic or inorganic.

The acidification can also be obtained by adding, to the seeds/water/salt (NaCl) mixture, an amount of sourdough to produce the desired pH. A sourdough is a mixture of flour (rye, wheat or others), of water and optionally of other ingredients (sugars, salt (NaCl), and the like) fermented by lactic acid bacteria. This lactic fermentation can be spontaneous or induced either by a mother sponge or by a starting preparation (starter) of lyophilized lactic ferments. Lactic bacteria produce lactic and acetic acid from the sugars of the flour and from the added sugars. The sourdough is thus acidic and can be used to decrease the pH of the abovementioned mixture of seeds, water and of salt (NaCl).

In this case, on the one hand, the sourdough acts as an acidifying agent and, on the other hand, it enriches the aroma of the bread, prepared with soaked seeds according to the invention.

Various additional ingredients, in particular those conventionally used in bakery applications, can be incorporated in the preparation. Mention may be made, among these, of various enzymes, proteins (e.g. gluten), fungicides, polysaccharides (e.g. guar) or alternatively of products which make it possible to preserve the freshness of the bread. Mention may also be made salts such as propionates and sorbates which release their free acid form in the presence of stronger acids (such as the lactic acid present in the preparation). They are used in the proportion of 1 to 10 g/kg.

It is possible to carry out this cooking either directly in the packaging container, insofar as it is resistant to cooking, or separately, for example in a cooking vessel with transfer of the cooked product into appropriate packagings under aseptic conditions. Preferably, in one case as in the other, the packaging is a vacuum packaging.

However, in practice, the acidified mixture of seeds, of water and of salt is preferably directly vacuum wrapped in packagings (sachets and the like) which are resistant to cooking.

The packagings containing the acidified seeds/water/salt mixture are then placed in a cooker of autoclave type so as to cook the product with a temperature between 95° C. and 120° C. for 10 to 60 minutes. This cooking softens the seeds by gelatinization of the starch and destroys the microorganisms contained in the product (sterilization). The cooking thus contributes to the preservation of the product and the undesirable fermentations are inhibited by the heat treatment and by the addition of acid. The salt can also contribute to the stabilization of the product.

The cooking is halted as soon as the softness of the seeds is satisfactory. The softness criteria are as follows:

the seed must soften a slight resistance to mastication ("al dente") remains the crumb of a loaf of bread containing these seeds is easy to slice the seeds must not disintegrate after a loaf of bread containing these seeds has been baked.

The temperature/cooking time combination is related to the type of seeds to be treated and will be determined easily by the person skilled in the art.

The final preparation of treated softened seeds according to the invention keeps for a minimum of 6 months at room temperature.

By way of illustration, various applications of the invention will be described in the following examples.

EXAMPLE 1

| Composition of the mixture | |
|---|---|
| Ingredients | Amounts (g) |
| Rye kernels | 368.03 |
| Water | 551.12 |
| Salt | 7.33 |
| Liquid rye sourdough* | 73.52 |
| Total | 1000.00 |

*: titratable acidity of the sourdough: 105 ml 0.1 N NaOH/10 g
place the mixture obtained in a sachet or a container which is resistant to cooking
seal the mixture under vacuum in the packaging
cook the mixture in an autoclave at 120° C. for 20 minutes

EXAMPLE 2

| Composition of the mixture | |
|---|---|
| Ingredients | Amounts (g) |
| Wheat kernels | 368.03 |
| Water | 551.12 |
| Salt | 7.33 |
| Liquid rye sourdough* | 73.52 |
| Total | 1000.00 |

*: titratable acidity of the sourdough: 105 ml 0.1 N NaOH/10 g
place the mixture obtained in a sachet or a container which is resistant to cooking
seal the mixture under vacuum in the packaging
cook the mixture in an autoclave at 120° C. for 20 minutes

EXAMPLE 3

| Composition of the mixture |
|---|
| mix 500 ml of whole rye seeds with 500 ml of water. Acidify to pH 4.0 by adding an 88% lactic acid solution |
| place the mixture obtained in a sachet or a container which is resistant to cooking |
| seal the mixture under vacuum in the packaging |
| cook the mixture in an autoclave at 120° C. for 20 minutes |

| Recipe for rye bread with Brühstück | |
|---|---|
| Ingredients | Amounts (kg) |
| Rye flour (type 1150) | 0.700 |
| Wheat flour (type 550) | 0.300 |
| Brühstück (rye seeds) cf. Example 1 | 0.300 |
| Purasauer* | 0.035 |
| Salt | 0.024 |
| Yeast | 0.012 |
| Water | 0.975** |

*acidifying product intended for the direct preparation of the rye bread; Purasauer is commercially available from PURATOS N.V. (Belgium).
**75% of the weight of flour and of the seeds
kneading: 5' (slow speed); 2' (high speed) using a Spiral Mixer (Eberhardt Maxmat)
temperature of the dough: 28° C.
bulk fermentation: 15'
dividing weight of the loaves of bread: 1150 g
moulding
final proofing: 120'
proofing temperature: 25–28° C.
baking time: 75'
temperature of the oven: 250 → 220° C. with steam using a Plate Oven (Wachtel Piccolo).

The softened seeds preparation can be incorporated in a bread dough during the final third or the final quarter of the kneading in order to prevent the seeds from being damaged by the mechanical forces of the kneading.

The usage level of the seeds varies according to the type of bread and the taste of the consumer. It should be noted that legislation lays down for some types of bread the minimum usage level of seeds to be used.

Of course, it should be noted that the order of the stages used in the process for the mixing of the seeds to be steeped with the water, the addition of the salt and the acidification do not constitute an essential element of the invention and that this order could be modified. Thus it is that the salt can, of course, be added after the acidification or alternatively even at the same time as the steeping water, for example, or that it can be added during the use in the bakery trade of the vacuum-packaged product.

The treated seeds are preferably cereal, fabaceae, cucurbitaceae or oleaginous seeds, and among these very particularly sunflower and soya.

EXAMPLE 4

Production of pre-soaked rye kernels - packaging in buckets

The product is prepared in a 2000 liter mixed tank.

Production of 1 ton soaked kernels:

1. Mixing of the ingredients

| | |
|---|---|
| Native corn starch | 36 kg |
| Water (20° C.) | 542 kg |
| Potassium sorbate solution (50%) | 2.82 kg |
| Rye sourdough (acidity 105 ml 0,1 N NaOH/10 g) | 68.5 kg |
| Salt | 6.85 kg |
| Rye kernels | 343.83 kg |

Mixing.

The rye kernels are cooked during 15 to 20 minutes at 90–92° C.

2. Cooling of the mixture

The mixture is cooled to 65° C.

3. Packaging in buckets

What is claimed is:

1. A process for preparing of whole or crushed softened seeds, for use as an ingredient in food compositions to be baked, wherein said process comprises the following steps:
   mixing the seeds with water;
   acidifying the mixture of seeds and of water to a pH of less than about 4.5 to create an acidified mixture of seeds and water;
   cooking the acidified mixture;
   mixing the cooked product with at least one ingredient selected from the group consisting of flour, salt, yeast and water; and
   baking said mixture.

2. A process according to claim 1, additionally comprising packaging the acidified mixture.

3. A process according to claim 1, wherein the mixing of the seeds with the water is carried out in the proportion of approximately one volume of seeds per volume of water.

4. A process according to claim 1, wherein acidification of the mixture of seeds and water is carried out at a pH of less than about 4.2.

5. A process according to claim 1, wherein acidification is carried out by addition of an organic acid.

6. A process according to claim 7 wherein said acid is selected from the group consisting of lactic acid, acetic acid, and citric acid.

7. A process according to claim 1, wherein acidification is carried out by adding an amount of sourdough to the mixture of seeds and water to obtain the desired pH.

8. A process according to claim 1, wherein the cooking is carried out directly in a packaging container which is resistant to the cooking temperature.

9. A process according to claim 1, wherein the cooking is carried out in a cooking vessel with subsequent transfer of the cooked product into packaging while observing aseptic conditions.

10. A process according to claim 1, wherein the cooking is carried out in a cooking vessel with subsequent transfer of the cooked product into packaging in the presence of a stabilizing agent.

11. A process according to any one of claims 8, 9 or 10, wherein the packaging is a vacuum packaging.

12. A process according to claim 1, wherein the stabilizing agent is selected from the group consisting of salts of sorbic acid and propionic acid.

13. A process according to claim 1, wherein the cooking comprises a heat treatment at a temperature of between 95 and 120° C. with a cooking time of between 10 and 60 minutes.

14. A process according to claim 1, wherein ingredients selected from the group consisting of enzymes, proteins, polysaccharides, fungicides, salts and a mixture thereof are added.

15. A process according to claim 1 wherein the seeds are selected from the group consisting of fabaceae, cucurbitaceae and oleaginous seeds.

16. A process according to claim 1 wherein the seeds are sunflower or soya seeds.

* * * * *